(No Model.)
B. F. BARNES.
MILLING MACHINE.
No. 529,013. Patented Nov. 13, 1894.
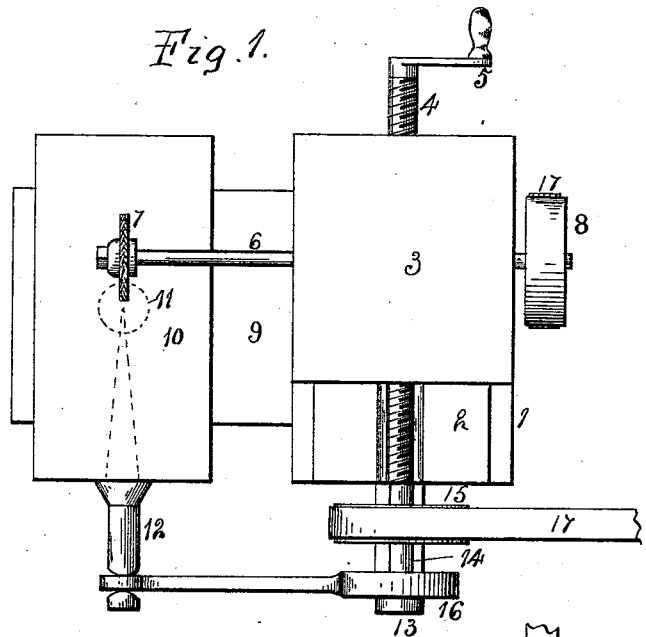
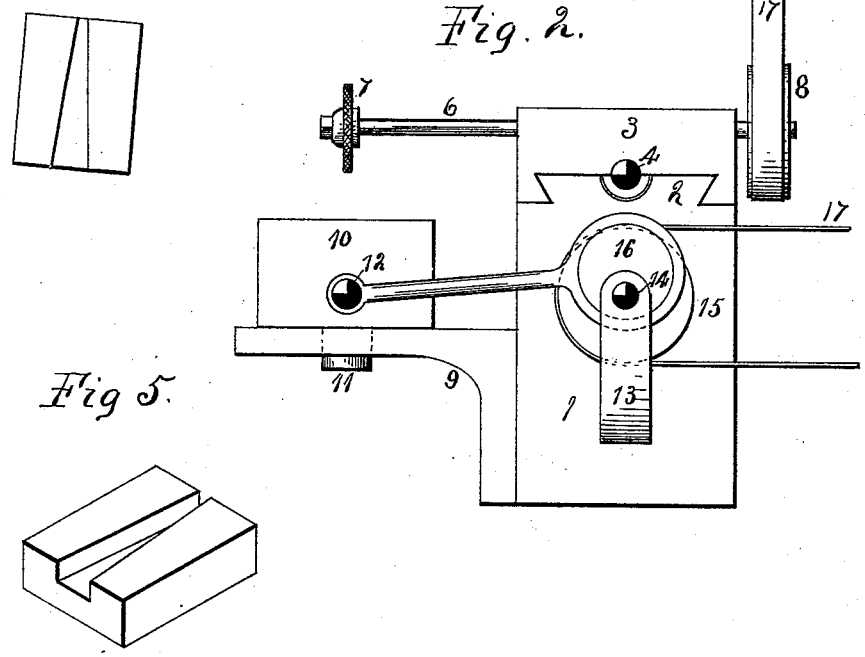
Witnesses:
H. M. Southworth
E. Behel
Inventor:
Benjamin F. Barnes
By A. O. Behel
Atty.

UNITED STATES PATENT OFFICE.

BENJAMIN F. BARNES, OF ROCKFORD, ILLINOIS, ASSIGNOR TO THE W. F. & JOHN BARNES COMPANY, OF SAME PLACE.

MILLING-MACHINE.

SPECIFICATION forming part of Letters Patent No. 529,013, dated November 13, 1894.

Application filed June 4, 1894. Serial No. 513,502. (No model.)

*To all whom it may concern:*

Be it known that I, BENJAMIN F. BARNES, a citizen of the United States, residing at Rockford, in the county of Winnebago and State of Illinois, have invented certain new and useful Improvements in Milling-Machines, of which the following is a specification.

The object of this invention is to construct a milling machine for cutting a tapering slot or groove by a single operation, and consists in an oscillating table upon which the work is located, and a rotary cutter for cutting the slot or groove.

In the accompanying drawings, Figure 1, is a plan view of my improved milling machine. Fig. 2, is an end elevation of the same. Figs. 3 and 4 show the two extreme positions the work occupies in forming the tapered groove therein shown. Fig. 5, is an isometrical representation of a tapered groove formed by the herein described machine.

The base 1, of the machine in this instance has its upper face provided with a guideway 2, which supports and guides a movable head 3, and a screw 4, supported by the base has a connection with the head and by means of the crank 5, the head may be moved across the base in either direction. This head supports a shaft 6, which supports a cutter at one end and a pulley 8, at its opposite end.

To one face of the base is secured a bracket 9, upon which is located a table 10, having a pivotal connection therewith in this instance by the stud 11, passing through a hole in the bracket, and from one end of the table extends an arm 12.

From one end of the base extends a bracket 13, its upper end supporting one end of a shaft 14, the other end of the shaft being supported by the base. This shaft supports a pulley 15, also an eccentric 16, which has a connection with the arm 12, extending from the table, and the pulleys 8 and 15, are connected with a prime mover by the belt 17.

The material to be operated upon is held in place upon the table and an oscillatory movement imparted thereto upon its pivot by its connection with the eccentric to which is imparted a rotary movement.

The sliding head carrying the rotary cutter is caused to move toward the material located upon the table, the material is constantly oscillated which will cause a tapered groove or slot to be cut, the angle of which depends upon the extent of the oscillatory movement of the table.

The slot or groove may start with the thickness of the cutter and gradually increase in width as shown at Figs. 3, 4, and 5, that is, if the cutter encounters the material over the center of the pivot of the table.

It is evident that the material may be placed some distance from the pivot of the table, and in such instance the slot or groove will be wider at the commencement than the thickness of the cutter. It is also evident that the cutter can be of any desired shape and still cut the entire surface of the material within the limits of the oscillation of the material. In this instance the cutter is made movable across the material but instead of which, the table may have a combined oscillatory and sliding movement which will accomplish the same result as I believe I am the first to cut a tapered slot or groove by imparting an oscillatory movement to the material while being operated upon.

I claim as my invention—

1. In a milling machine the combination of a rotary cutter a table having a pivotal movement and means for automatically imparting an oscillatory movement to the table.

2. In a milling machine the combination of a rotary cutter having a sliding movement, a table for supporting the material to be operated upon having a pivotal movement, and means for automatically imparting an oscillatory movement to the table.

BENJAMIN F. BARNES.

Witnesses:
JOHN BARNES,
A. O. BEHEL.